United States Patent
Yamaguchi et al.

(10) Patent No.: US 7,379,210 B2
(45) Date of Patent: May 27, 2008

(54) IMAGE PROCESSING APPARATUS, IMAGE FORMING APPARATUS, AND IMAGE PROCESSING METHOD

(75) Inventors: Tomohiro Yamaguchi, Shinshiro (JP); Kazuhiro Ishiguro, Toyohashi (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 950 days.

(21) Appl. No.: 10/460,390

(22) Filed: Jun. 13, 2003

(65) Prior Publication Data

US 2004/0190068 A1   Sep. 30, 2004

(30) Foreign Application Priority Data

Mar. 25, 2003   (JP) ............................. 2003-082870

(51) Int. Cl.
*H04N 1/405* (2006.01)
*H04N 1/409* (2006.01)

(52) U.S. Cl. .................. 358/2.1; 358/1.9; 358/298; 358/447; 382/266; 382/267

(58) Field of Classification Search ............. 358/1.9, 358/2.1, 298, 447; 382/266, 267
See application file for complete search history.

(56) References Cited

U.S. PATENT DOCUMENTS 5,832,141 A * 11/1998 Ishida et al. ............... 382/298

2002/0126315 A1 * 9/2002 Nabeshima ................. 358/3.03

FOREIGN PATENT DOCUMENTS

JP   8-181864   7/1996

* cited by examiner

*Primary Examiner*—King Y. Poon
*Assistant Examiner*—Quang N. Vo
(74) *Attorney, Agent, or Firm*—Buchanan Ingersoll & Rooney PC

(57) ABSTRACT

It is intended to provide an image processing apparatus capable of precisely discriminating a halftone dot region and a figure such as a character arranged on the halftone dot region and applying appropriate image processing to the halftone dot region and the character separately. An isolated point discriminating section detects presence of an isolated point and detects a size of the detected isolated point. A temporary halftone dot region discriminating section 42 determines a temporary halftone dot region by counting the number of isolated point signals detected. Thereby, a region where isolated points concentrate is regarded as a temporary halftone dot region. An isolated point magnifying section 43 magnifies the detected isolated point signal to its original size so as to determine a magnified isolated point region. A halftone dot region restricting section 44 takes an AND computation results of the temporary halftone dot region and the magnified isolated point region. Thereby, in the temporary halftone dot region, only a place where an isolated point actually exists is regarded as a halftone dot processing region. Accordingly, in case a character or the like exists on a halftone dot region, the character is not included in a halftone dot processing region.

17 Claims, 20 Drawing Sheets

FIG.5

|  |  |  |
|---|---|---|
| D00 | D01 | D02 |
| D10 | D11 | D12 |
| D20 | D21 | D22 |

FIG.6

D11 < min( D10, D12 ) − THRESHOLD A (with surrounding D00, D01, D02, D20, D21, D22)

FIG.7

| D00 | D01 | D02 | D03 | D04 |
|-----|-----|-----|-----|-----|
| D10 | D11 | D12 | D13 | D14 |
| D20 | D21 | D22 | D23 | D24 |
| D30 | D31 | D32 | D33 | D34 |
| D40 | D41 | D42 | D43 | D44 |

FIG.8 ave( [D11 D12 D13 / D21 D22 D23 / D31 D32 D33] ) < min( [D00 D01 D02 D03 D04 / D10 ... D14 / D20 ... D24 / D30 ... D34 / D40 D41 D42 D43 D44] ) − THRESHOLD B

TEMPORARY HALFTONE DOT REGION

RESTRICTED HALFTONE DOT REGION

IMAGE PROCESSING APPARATUS, IMAGE FORMING APPARATUS, AND IMAGE PROCESSING METHOD

This application is based on Application No. 2003-82870 filed in Japan, contents of which is hereby incorporated by reference.

BACKGROUND OF THE INVENTION

1. Field of the Invention

The present invention relates to an image processing apparatus, an image forming apparatus, and image processing method for applying image processing to image data so as to accomplish proper image formation. More particularly, it relates to an image processing apparatus, an image forming apparatus, and image processing method for discriminating a halftone dot region in an image so as to apply particular processing such as moiré prevention to the halftone dot region.

2. Description of Related Art

For image processing of a halftone dot region, conventional image processing apparatuses such as digital copier, printer, and the like, have applied particular processing such as smoothing and the like that is different from processing of other regions. That is, in the halftone dot region, moiré can occur due to interference of read resolution and halftone dot frequency. When moiré occurs, quality of image deteriorates. Therefore, it is necessary to prevent moiré from occurring. Japanese laid-open patent application No. 8-181864 discloses such type of image processing. An image processing apparatus directed to No. 8-181864 detects mountain peaks and valley peaks in image data (in this specification, these peaks are generally termed isolated points). By treating density of those peaks as index of halftone dot degree, there is detected what extent density of halftone dots is formed with a pixel and vicinity of the pixel.

However, in case an image such as a character, a figure, or the like, exists near isolated points, the image processing apparatus directed to No. 8-181864 cannot separate the character region and isolated points appropriately. As a result, particular image processing to be applied to a halftone dot region is erroneously applied to a character and the like arranged near isolated points.

SUMMARY OF THE INVENTION

The present invention has been made in order to solve the foregoing problem. It is an object of the present invention to provide an image processing apparatus, an image forming apparatus, and image processing method capable of precisely discriminating a halftone dot region and a character and the like arranged on the halftone dot region and applying appropriate image processing to the halftone dot region and to the character and the like separately.

To resolve the above problems, there is provided an inventive image processing apparatus for extracting a halftone dot region in inputted image data, the image processing apparatus comprising: an isolated point detecting section for detecting an isolated point in inputted image data and a size of the isolated point; a temporary halftone dot region determining section for determining a temporary halftone dot region based on presence of isolated points detected by the isolated point detecting section; an isolated point magnifying section for determining a magnified isolated point region that is equivalent to magnification of an isolated point detected by the isolated point detecting section up to at least a size of the isolated point detected by the isolated point detecting section; and a halftone dot region restricting section for determining a halftone dot processing region that is equivalent to restriction of a temporary halftone dot region with reference to a magnified isolated point region based on a temporary halftone dot region determined by the temporary halftone dot region determining section and a magnified isolated point region determined by the isolated point magnifying section. An inventive image forming apparatus further comprises an image forming engine for forming an image based on the image data the halftone dot region of which has been processed with predetermined image processing. Furthermore, there is also provided inventive image processing method for extracting a halftone dot region in inputted image data, the image processing method comprising: a first step of detecting an isolated point in inputted image data and a size of the isolated point; a second step of determining a temporary halftone dot region based on presence of isolated points detected at the first step; a third step of determining a magnified isolated point region that is equivalent to magnification of an isolated point detected at the first step up to at least a size of the isolated point detected at the first step; and a fourth step of determining a halftone dot processing region that is equivalent to restriction of a temporary halftone dot region with reference to a magnified isolated point region based on a temporary halftone dot region and a magnified isolated point region determined at the second and third steps.

In the present invention, the isolated point detecting section detects an isolated point in inputted image data and a size of the isolated point. Generally, an isolated point is detected as a single pixel even though the isolated point is large somewhat. Then, size information is given to each pixel extracted as an isolated point. Next, the temporary halftone dot region determining section determines a temporary halftone dot region. This determination is made based on presence of isolated points detected. To be more specific, a region where density of isolated points is high is discriminated as a temporary halftone dot region. At this stage, a character and a figure may be included in the temporary halftone dot region determined. Therefore, the isolated point magnifying section determines a magnified isolated point region. A magnified isolated point region to be determined is equivalent to a region magnified up to a size of an isolated point as a single pixel by the isolated point detecting section. A magnified isolated point region may be magnified to a size larger than an actual size. Next, the halftone dot restringing section determines a halftone dot processing region. This decision is made based on the temporary halftone dot region and the magnified isolated region wherein the temporary halftone dot region is restricted by the magnified isolated point region. Thereby, a character and the like are excluded from the halftone dot processing region.

The thus determined halftone dot processing region is a region smaller than a temporary halftone dot region determined as so since density of isolated points is high. That is, even if the region has high density of isolated points, it does not hold true of a halftone dot processing region as long as it is not a magnified isolated point region. Therefore, a region included in a character or a figure, for example, is not a halftone dot processing region even though it is on a temporary halftone dot region. Accordingly, even though particular image processing such as smoothing and the like is applied to a halftone dot processing region, such particular image processing is not applied to a character or the like.

Therefore, the present invention can apply appropriate processing to a halftone dot region and to a character region separately.

Preferably, in the inventive image processing apparatus, the isolated point detecting section extracts an isolated point in inputted image data using a plurality of matrixes different in size. It is preferable that in case an isolated point is extracted, a size of the extracted isolated point is set to same as a size of a matrix that has extracted the isolated point. By setting so, sizes and the number of isolated points that are large to some extent can be appropriately recognized. An identical pixel can possibly be extracted as an isolated point by a plurality of matrixes. In such a case, the size of the extracted isolated point is set to a size that is the largest among the plurality of the matrixes that have extracted the extracted isolated point.

Furthermore, it is preferable that the isolated point detecting section detects a light isolated point and a dark isolated point separately. A light isolated point is a point of high lightness surrounded with a region of low lightness. Vice versa, a dark isolated point is a point of low lightness surrounded with a region of high lightness. Therefore, the temporary halftone dot region determining section separately counts up the number of light isolated points and that of dark isolated points both of which are detected by the isolated point detecting section. A temporary halftone dot region is determined based on count values of respective types of isolated points. Thereby, determination of a temporary halftone dot region can be made more appropriately.

Since light isolated points and dark isolated points are separately detected, the halftone dot region restricting section can deal in different manners between a temporary halftone dot region where the number of light isolated points exceeds that of dark isolated points and a temporary halftone dot region where the number of dark isolated points exceeds that of light isolated points. Generally, a character or the like to be excluded from the object of image processing for a halftone dot region is either a light character or a dark character. A light character is a character of high lightness surrounded with a region of low lightness. Vice versa, a dark character is a character of low lightness surrounded with a region of high lightness. For example, provided that a character and the like is a dark character, it is preferable that a temporary halftone dot region is treated in following manners. That is, a temporary halftone dot region where the number of light isolated points exceeds that of dark isolated points is regarded as a halftone dot processing region without restriction by a magnified isolated point region. On the other hand, as to a temporary halftone dot region where the number of dark isolated points exceeds that of light isolated points, a logical product of this region and a magnified isolated point region is regarded as a halftone dot processing region. In case a character and the like is a light character, a temporary halftone dot region can be treated in manners opposite to the case of a temporary halftone dot region against a dark character. Thereby, a halftone dot processing region can be determined more appropriately. In this case, the isolated point magnifying section can magnify either light isolated points or dark isolated points, one of which exceeding in number, up to size detected by the isolated point detecting section.

That is, in case a dark character is excluded from an object of image processing of a halftone dot region, a logical product of a temporary halftone dot region and a magnified isolated point region can be taken with respect to a temporary halftone dot region where the number of dark isolated points exceeds that of light isolated points. In this case, the isolated point magnifying section can magnify only dark isolated points up to respective sizes detected by the isolated point detecting section. Not to mention, in case a light character is excluded from an object of image processing of a halftone dot region, light isolated points can be treated in manners opposite to case of dark isolated points.

Furthermore, in the inventive image processing apparatus, the isolated point magnifying section can magnify target isolated points to sizes larger than respective sizes detected by the isolated point detecting section and after that, reduce respective sizes to regard the isolated points as a magnified isolated point region. Thereby, in a region where target isolated points are arranged closely to one another, isolated regions are joined together at the step of magnification processing. Therefore, even though reduce processing is applied to the magnified region, isolated points are still joined together. As a result, the entirety of the region and its surrounding become a magnified isolated region. If it is actually a halftone dot region, the halftone dot region and its surrounding can possibly become a magnified isolated region. On the other hand, a single isolated point generated due to a noise can return to its original size by applying reduce processing after magnification. Therefore, the entirety of a single isolated point and its surrounding cannot be a magnified isolated point region. Accordingly, an actual halftone dot region and isolated points due to noises can be treated differently.

The above and further objects and novel features of the invention will more fully appear from the following detailed description when the same is read n connection with the accompanying drawings. It is to be expressly understood, however, that the drawings are for the purpose of illustration only and are not intended as a definition of the limits of the invention.

BRIEF DESCRIPTION OF DRAWINGS

For a better understanding of the present invention, reference is made to the following detailed description of the invention, just in conjunction with the accompanying drawings in which:

FIG. 5 shows a matrix used for discriminating a one-dot black isolated point;

FIG. 6 is a diagram for illustrating discriminating condition with respect to the matrix of FIG. 5;

FIG. 7 shows a matrix used for discriminating a two-to-three-dot black isolated point;

FIG. 8 is a diagram for illustrating discrimination condition with respect to the matrix in FIG. 7;

DETAILED DESCRIPTION OF PREFERRED EMBODIMENTS

Reference will now be made in detail to presently preferred embodiments of the invention as illustrated in the accompanying drawings. The present embodiment is an example of an image forming apparatus on which an image processing apparatus is mounted and forms an image on a recording medium with an image forming engine receiving image data and applying appropriate image processing to the image data. Above all, the present invention is characterized by the image processing apparatus.

First Embodiment

Figure 1:
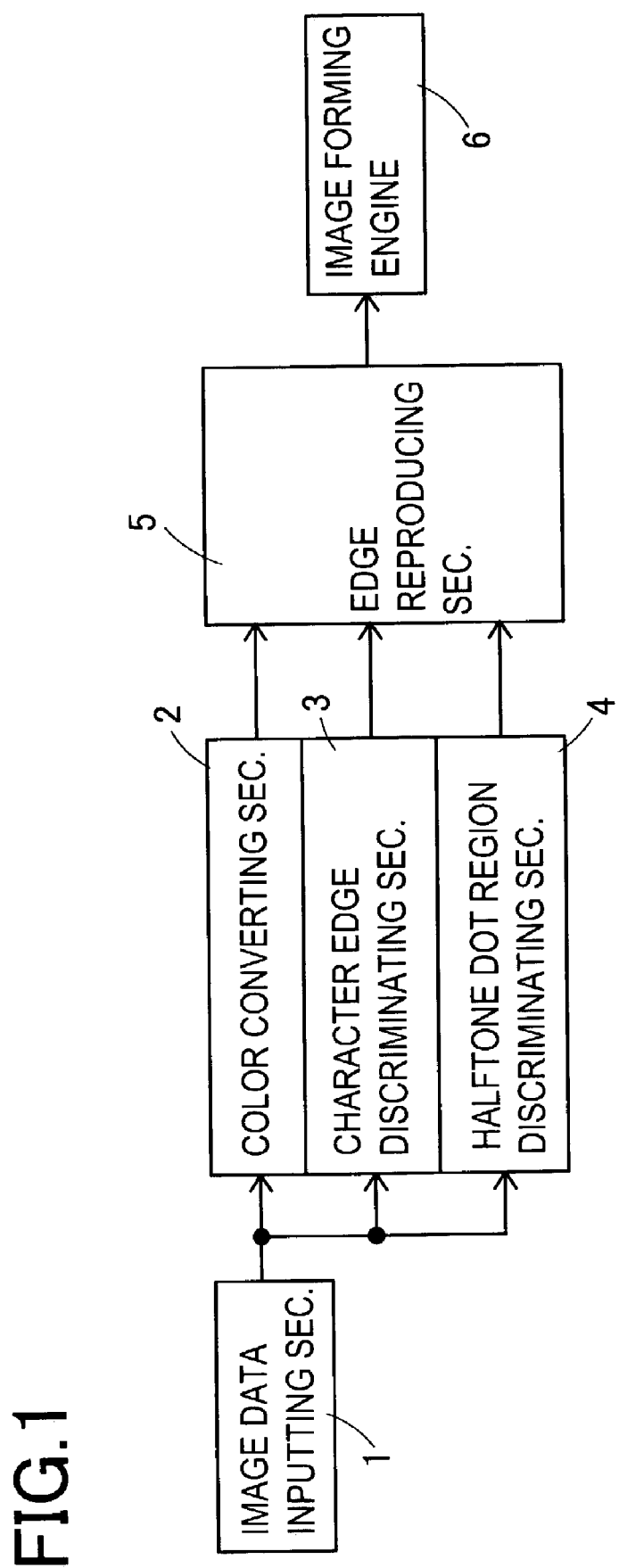
FIG. 1 is a block diagram schematically showing structure of an image forming apparatus directed to an embodiment.

FIG. 1 shows schematic structure of an image forming apparatus directed to a first embodiment. That is, the image forming apparatus of the first embodiment comprises an image data inputting section 1, a color converting section 2, a character-edge discriminating section 3, a halftone dot region discriminating section 4, an edge reproducing section 5 and an image forming engine 6.

The image data inputting section 1 is a block that receives inputs of image data from a personal computer, a scanner, or a switched line. The color converting section 2 is a block that converts input-system color space (RGB, Lab or the like) into output-system color space (CMYK or the like). The character edge discriminating section 3 is a block that extracts a character edge included in inputted image data and sets a character edge flag on extracted pixels. The halftone dot region discriminating section 4 is a block that extracts a halftone dot region and set a halftone dot region flag on pixels belonging to the extracted region. As described hereafter, the halftone dot region discriminating section 4 extracts a restricted halftone dot region that is a further restricted region of general halftone dot region. The edge reproducing section 5 is a block that applies image processing such as edge enhancement, smoothing or the like, to image data that is converted through the color converting section 2 in accordance with a character edge flag and a halftone dot region flag. The image forming engine 6 is a block that forms an image on a recording medium along with a well-known image forming system such as electronic photo copy system or inkjet system based on resultant image data obtained through image processing at the edge reproducing section 5.

Figure 2:
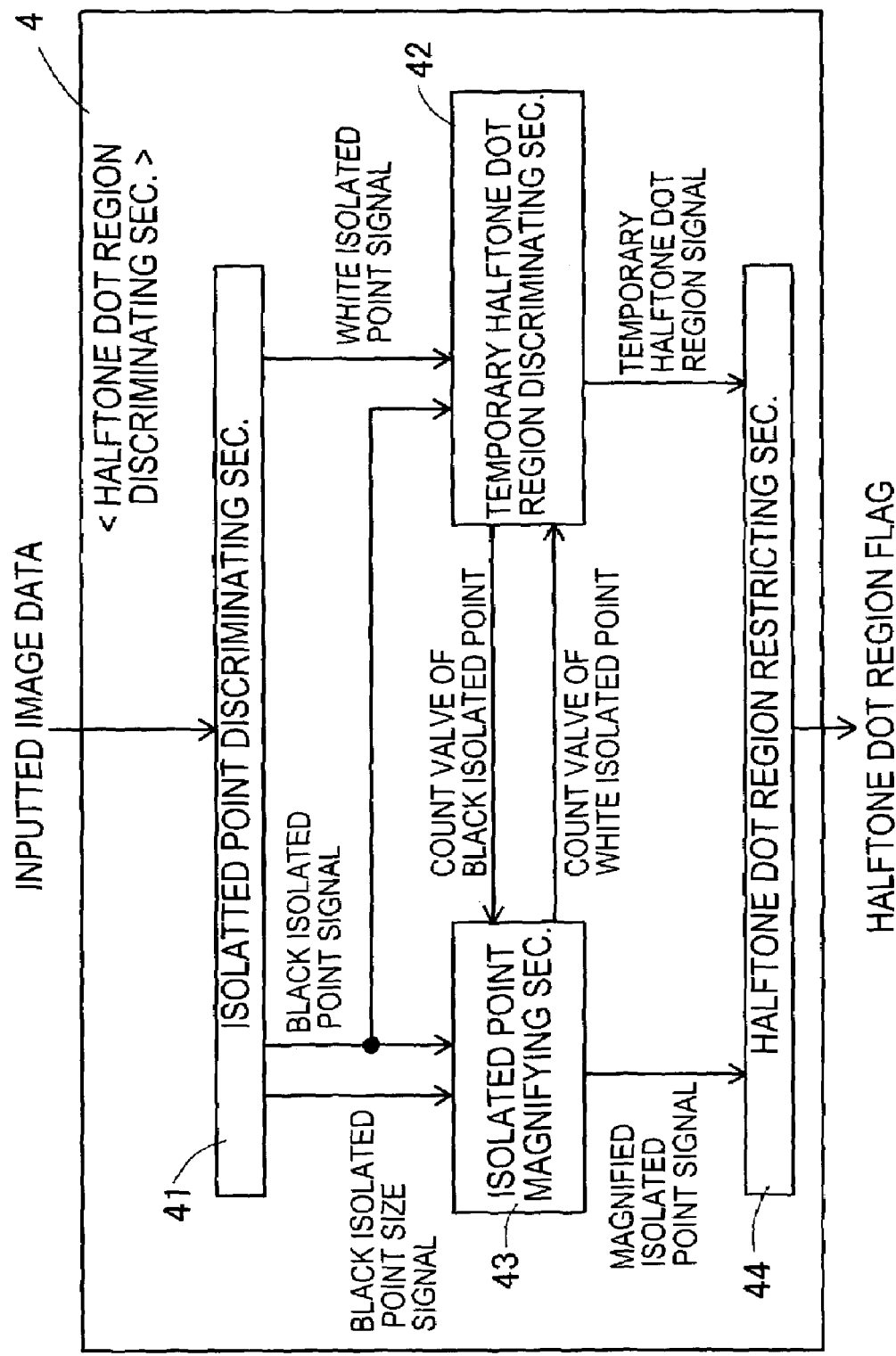
FIG. 2 is a block diagram showing structure of halftone dot region discriminating section in FIG. 1.

An image processing apparatus is constituted by the color converting section 2, the character edge discriminating section 3, the halftone dot region discriminating section 4, and the edge reproducing section 5 as shown in the block diagram of FIG. 1. The present invention is characterized by the halftone dot region discriminating section 4. Structure of the halftone dot region discriminating section 4 will be further described by referring to FIG. 2 through FIG. 12. As shown in FIG. 2, the halftone dot region discriminating section 4 comprises an isolated point discriminating section 41, a temporary halftone dot region discriminating section 42, an isolated point magnifying section 43, and a halftone dot region restricting section 44.

Figure 3:
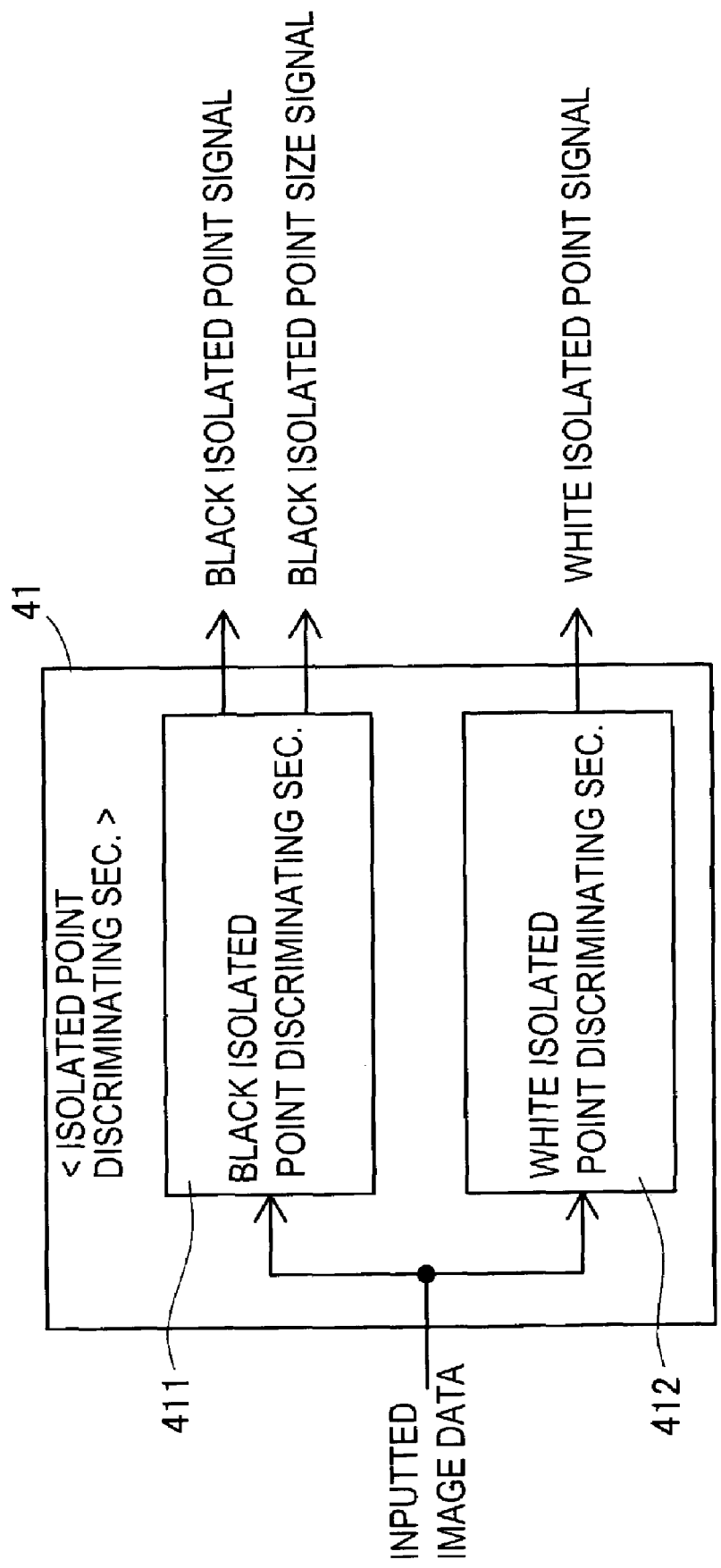
FIG. 3 is a block diagram showing structure of an isolated point discriminating section in FIG. 2.

As shown in FIG. 3, the isolated point discriminating section 41 comprises a black isolated point discriminating section 411 and a white isolated point discriminating section 412. That is, the isolated point discriminating section 41 discriminates black isolated points and white isolated points separately.

Figure 4:
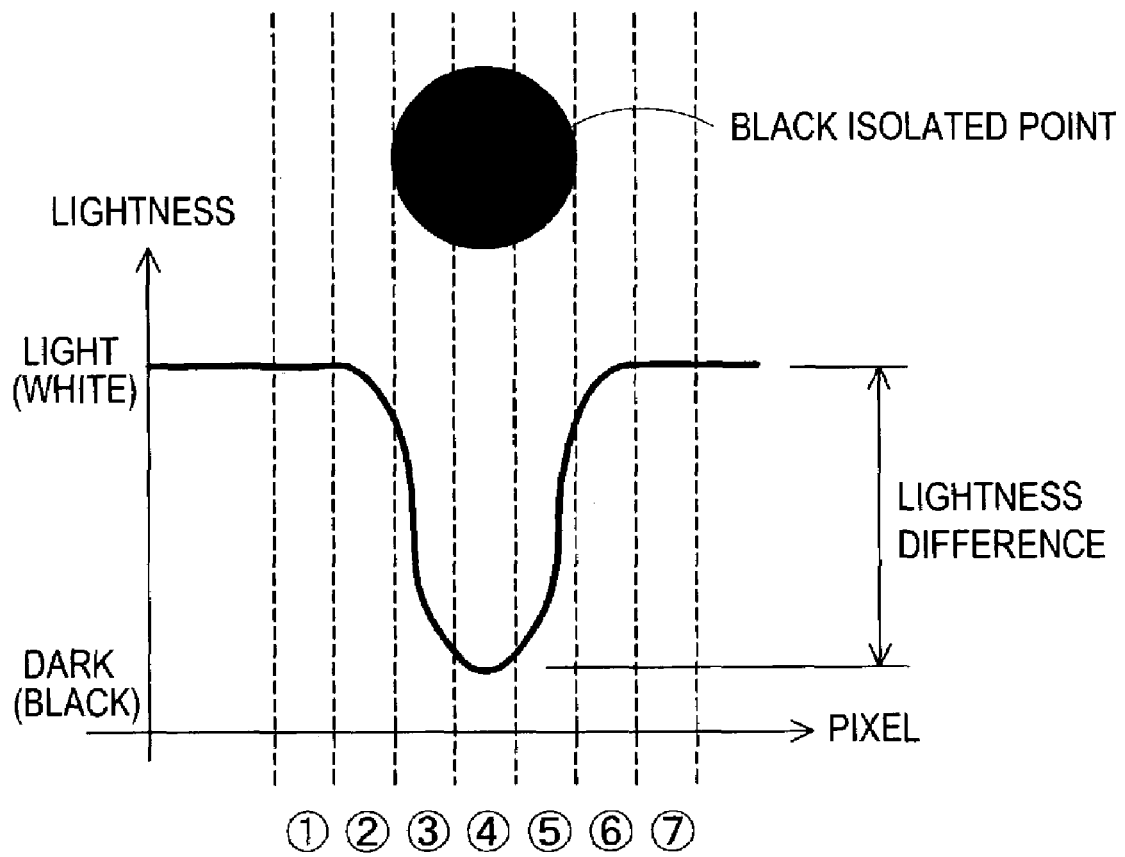
FIG. 4 is a diagram for illustrating lightness distribution at respective portions of a black isolated point along with a graph.

As an example of these, a discrimination manner of black isolated points at the black isolated point discriminating section 411 will be described. FIG. 4 shows lightness distribution at a portion of a black isolated point. As shown in lightness curve of FIG. 4, pixels at a border of a black isolated point and background (②, ③, ⑤, ⑥) in a horizontal axis), lightness of the black isolated point and that of the background interact with each other. As it comes to be closer to center of the black isolated point, a pixel shows low lightness. Therefore, a pixel at the center of the black isolated point (④), in the horizontal axis) has the lowest lightness with reference to pixels around the center. Furthermore, lightness distribution is almost symmetrical with reference to the center pixel.

Making use of the above-described lightness distribution characteristic, the black isolated point discriminating section 411 extracts black isolated points with matrixes shown in FIG. 5 and FIG. 7. The matrix shown in FIG. 5 extracts a one-dot-sized black isolated point. FIG. 6 shows conditions for extracting a target pixel D11 as a black isolated point in the matrix shown in FIG. 5. In FIG. 6, D00-D22 indicate lightness values of respective pixels. A legend "min" represents a minimum value. That is, in case lightness of a target pixel is lower than a minimum lightness among eight pixels that surround the target pixel and lightness difference between the target pixel and "min" is same as or larger than a threshold A, the target pixel is extracted as a black isolated point.

FIG. 7 shows a matrix to extract a two-to-three-dot-sized black isolated point. FIG. 8 shows conditions for extracting a target pixel D22 as a black isolated point in the matrix shown in FIG. 7. A legend "ave" represents an average value. That is, in case average lightness of nine pixels, i.e., a target pixel D22 and eight pixels that surround the target pixel, is lower than a minimum lightness among sixteen pixels that surround the nine pixels and lightness difference between "ave" and "min" is same as or larger than a threshold B, the target pixel is extracted as a black isolated point. It should be noted that D22 is the only pixel extracted as a black isolated point with the matrix shown in FIG. 7. This is because a black isolated point is always recognized as a single point (a pixel) even if it is a large-sized isolated point. Although two different-sized matrixes are shown in FIG. 5 and FIG. 7, even-larger-sized matrixes may be used to extract a center pixel of an even larger black isolated point. For a pixel extracted as a black isolated point, a black isolated point signal is set on.

The black isolated point discriminating section 411 thus uses a plurality matrixes different in size and extracts black isolated points in the inputted image data. Therefore, size of extracted black isolated points can be recognized by size of a matrix used for extraction. That is, a black isolated point extracted with the matrix in FIG. 5 is one-dot sized and a black isolated point extracted with the matrix in FIG. 7 is two-to-three-dot sized. It is a black isolated point size signal that indicates a size of thus obtained black isolated point. A pixel may possibly be extracted as a black isolated point by a plurality of matrixes different in size. In such a case, the size of the black isolated point is regarded as a size corresponding to a largest-sized matrix among the matrixes that have extracted the black isolated point.

A manner of discriminating white isolated points at the white isolated point discriminating section 412 is quite opposite processing manner by the black isolated point discriminating section 411: light-dark relation is processed in opposite way. That is, white isolated points in inputted image data are extracted with a plurality of matrixes different in size. However, dealing of light-dark relation is quite opposite to the case of the matrixes shown in FIG. 5 and FIG. 7. Furthermore, discrimination conditions are quite opposite to the case shown in FIG. 6 and FIG. 8 in terms of light-dark relation. Along with that manner, a white isolated point signal is outputted by the white isolated point discriminating section 412. According to this explanation, the white isolated point discriminating section 412 can receive a white isolated point size signal. However, in this embodiment, a white isolated point size signal will not be used.

Figure 9:
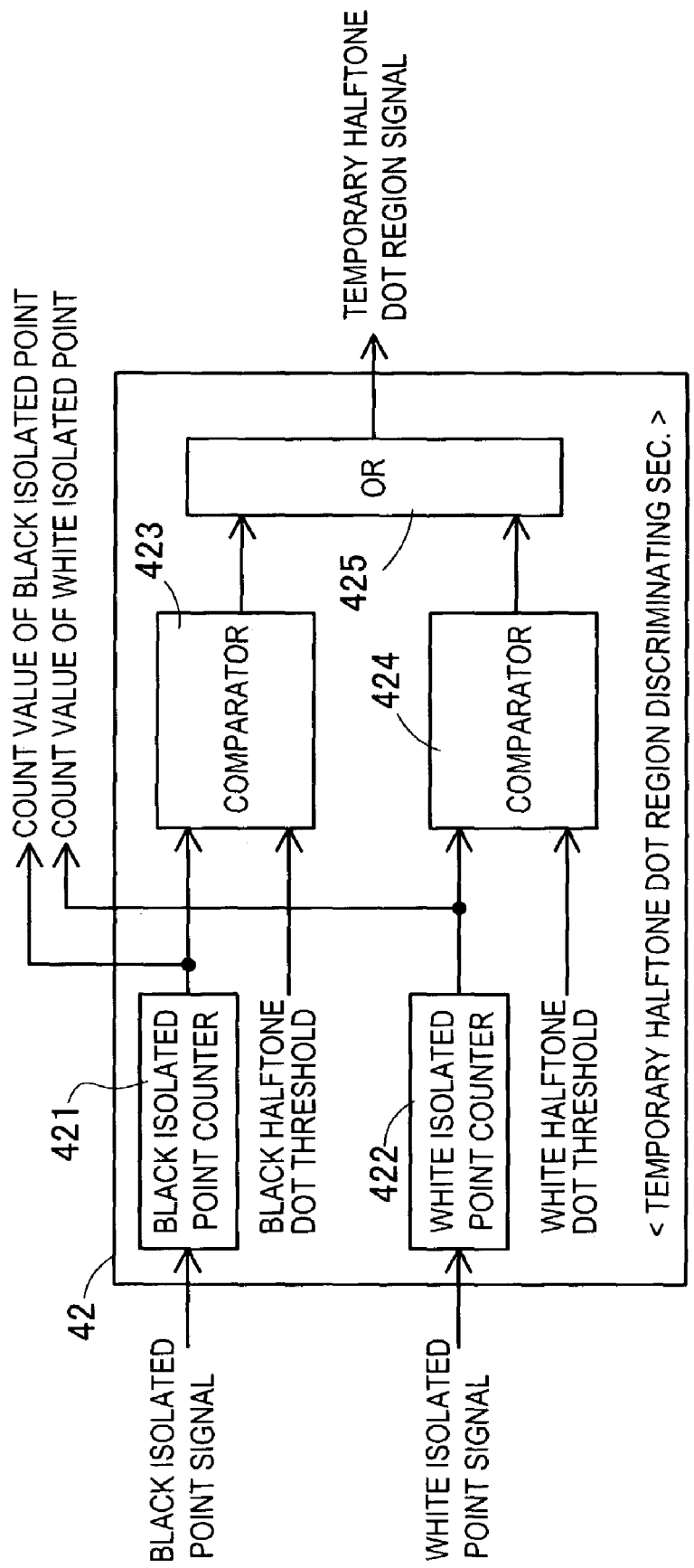
FIG. 9 is a block diagram showing structure of a temporary halftone dot region discriminating section in FIG. 2.

Next, the temporary halftone dot region discriminating section 42 will be described. As shown in FIG. 9, the temporary halftone dot region discriminating section 42 includes a black isolated point counter 421, a white isolated point counter 422, a comparator 423, a comparator 424, and an OR circuit 425. The black isolated point counter 421 receives a black isolated point signal from the black isolated point discriminating section 411 in the isolated point discriminating section 41. Similarly, the white isolated point counter 422 receives a white isolated point signal from the white isolated point discriminating section 412 in the isolated point discriminating section 41.

The black isolated point counter 421 counts up the number of black isolated points in a predetermined region. A count value of black isolated points and a predetermined black halftone dot threshold are inputted to the comparator 423. In case the count value is larger than the black halftone dot threshold, the comparator 423 outputs an ON-signal to the OR circuit 425. The white isolated point counter 422 counts up the number of white isolated points in a predetermined region. A count value of white isolated points and a predetermined white halftone dot threshold are inputted to the comparator 424. In case the count value is larger than the white halftone dot threshold, the comparator 424 outputs an ON-signal to the OR circuit 425.

In case at least either one of the two comparators, namely, comparator 423 or the comparator 424, outputs an ON signal, the OR circuit 425 sets an output ON. That is, in case at least either one of the count values, namely, a count value of black isolated points or that of white isolated points, is larger than a corresponding threshold, the temporary halftone dot region discriminating section 42 discriminates the pixels of the region as a part of a temporary halftone-dot region and sets a temporary halftone dot region signal ON. It should be noted that a count value of black isolated points and that of white isolated points are used at the isolated point magnifying section 43 that will be described hereinafter.

Figure 10:
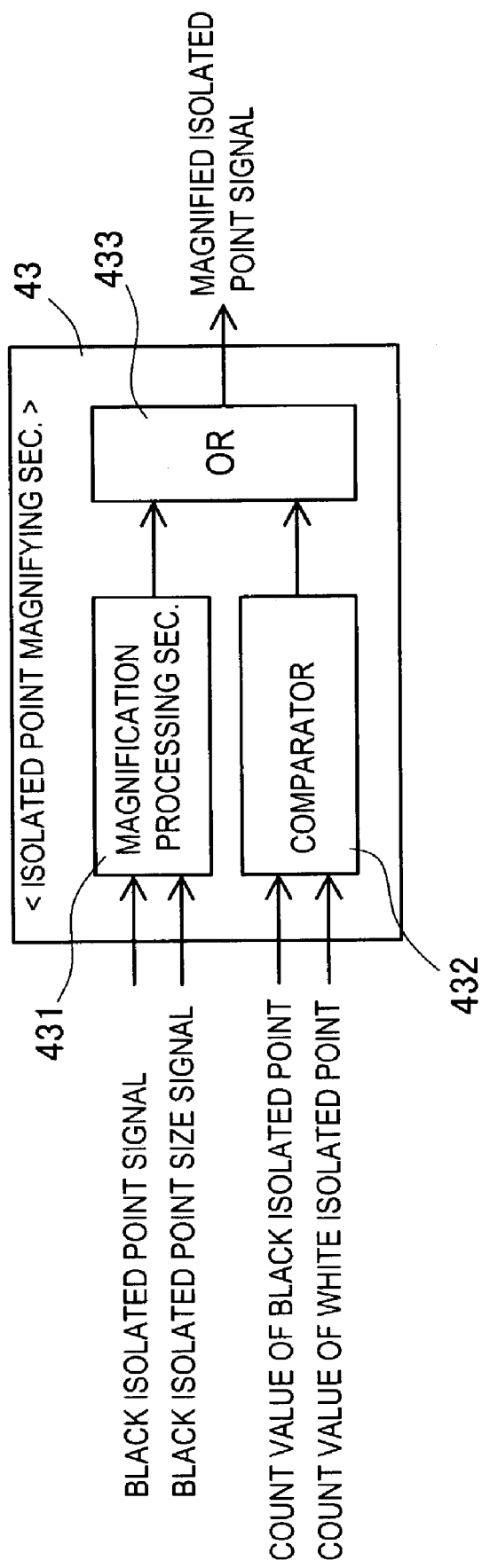
FIG. 10 is a block diagram showing structure of an isolated point magnifying section in FIG. 2.

As shown in FIG. 10, the isolated point magnifying section 43 includes a magnification processing section 431, a comparator 432, and an OR circuit 433. The magnification processing section 431 is designed to receive a black isolated point signal and a black isolated point size signal from the black isolated point discriminating section 411 in the isolated point discriminated section 41. The comparator 432 is designed to receive a count value of black isolated points and that of white isolated points from the temporary halftone dot region discriminating section 42.

Figure 11:
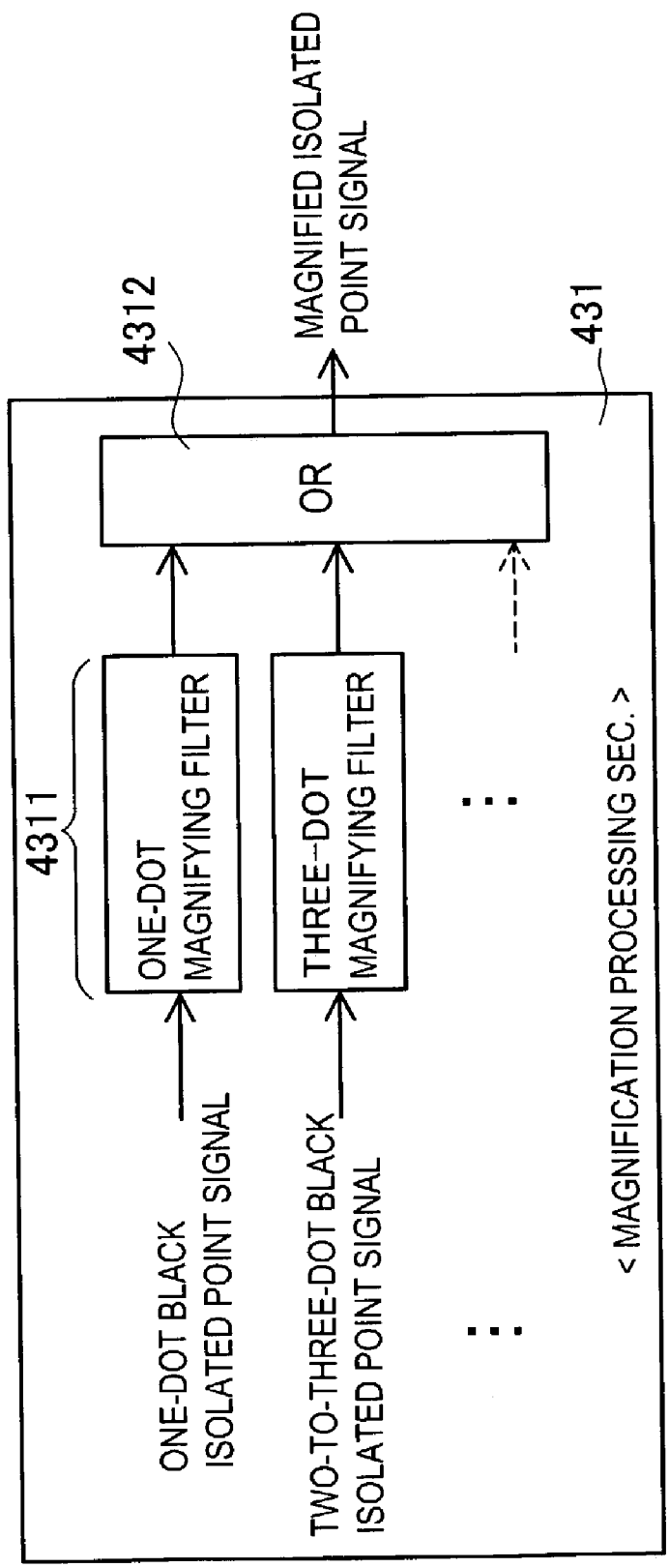
FIG. 11 is a block diagram showing structure of magnification processing section in FIG. 10.

The magnification processing section 431 determines a magnified isolated region by magnifying each pixel extracted as a black isolated point by the black isolated point discriminating section 411 in the isolated point discriminating section 41 in accordance with a black isolated point size signal. As shown in FIG. 11, the magnification processing section 431 includes a magnifying filter group 4311 and an OR circuit 4312. The magnifying filter group 4311 is provided with a plurality of magnifying filters. The number of filters is same as the number of matrixes for black isolated point extraction in the black isolated point discriminating section 411. Furthermore, a magnification size of each magnifying filter is equivalent to an extraction size of each matrix in the black isolated point discriminating section 411. A black isolated point signal is inputted to a suitable magnifying filter in the magnifying filter group 4311 in accordance with a corresponding black isolated point size signal. That is, a one-dot black isolated point signal is inputted to a one-dot magnifying filter and a two-to-three-dot black isolated point signal is inputted to a three-dot magnifying filter.

Figure 12:
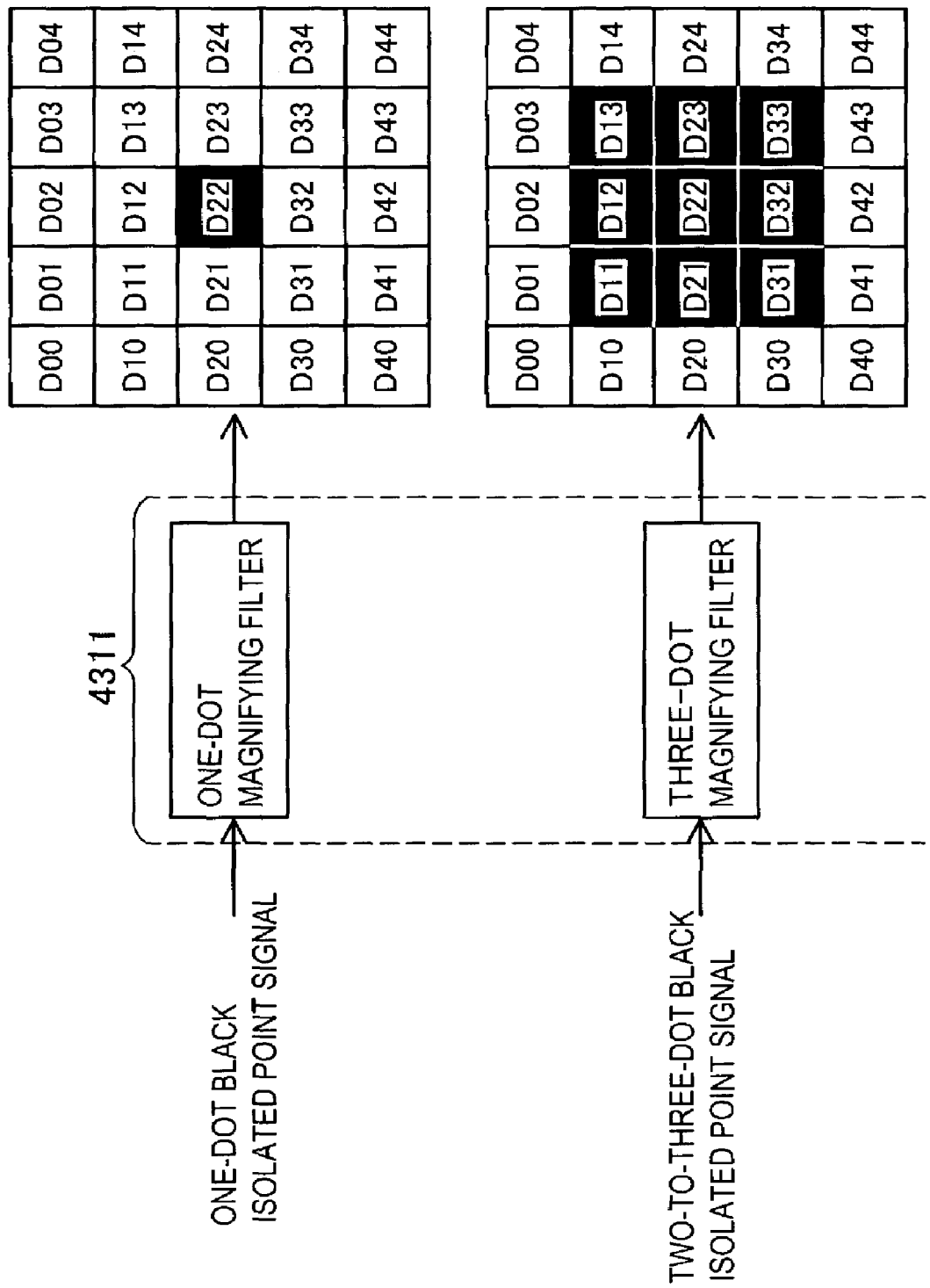
FIG. 12 is a diagram showing processing at the magnification processing section in FIG. 11.

In case a black isolated point size of which corresponds to size of a filter exists within a magnified-sized region where a target pixel is centered, each magnifying filter determines the entirety of the region as a isolated point region. Thereby, as shown in FIG. 12, respective sized black isolated points are magnified up to sizes respectively detected. It should be noted that processing by the one-dot magnifying filter is actually made in a manner of through processing. Isolated point regions magnified by respective magnifying filters are finally brought together at the OR circuit 4312 shown in FIG. 11. Thereby, there is set a magnified isolated point signal ON with respect to a pixel discriminated as an isolated point region. This signal is one of the two signals to be inputted to the OR circuit 433 shown in FIG. 10.

The comparator 432 compares a count value of black isolated points and that of white isolated points. In case a count value of white isolated points is larger than that of black isolated points, the comparator 432 outputs an ON signal. This signal is another one of the two signals to be inputted to the OR circuit 433.

In case at least either one of the magnification processing section 431 or the comparator 432 outputs an ON signal, the OR circuit 433 in FIG. 10 outputs an ON signal. That is, this is a magnified isolated point signal. Accordingly, in case one of the following two conditions is met, a magnified isolated point signal is set ON. The first condition is applied for a region where the number of black isolated points is larger than that of the white isolated points, in other words, a highlighted halftone dot region. According to the first condition, only for dots actually occupied with a black isolated point, the signal is set ON. The second condition is applied for a region where the number of white isolated points is larger than that of the black isolated points, in other words, a shadowy halftone dot region. According to the second condition, for entirety of white isolated points and their surroundings, the signal is set ON. There will be described later why a black isolated point and a white isolated point are thus handled differently.

After that, a temporary halftone dot region signal outputted from the temporary halftone dot region discriminating section 42 and a magnified isolated point signal from the isolated point magnifying section 43 are inputted to a halftone dot region restricting section 44. The halftone dot region restricting section 44 is designed to output a signal that is an AND computation result of the above two signals. That is, this is a halftone dot region flag. Accordingly, a halftone dot flag is set up on a region equivalent to a temporary halftone dot region restricted with a magnified isolated point region. That is, with respect to highlighted halftone dot region, it is restricted to a region that holds true of both of a temporary halftone dot region and a magnified isolated point. On the other hand, with respect to a shadowy halftone dot region, there is not restriction like the former case and a halftone dot region flag is set up on the entirety of the halftone dot region. All of the above described so far is processing at the halftone dot region discriminating section 4 shown in FIG. 1.

A halftone dot region flag thus obtained is inputted to an edge reproducing section 5 together with image data converted by the color converting section 2 and a character edge flag from a character edge discriminating section 3. Therefore, the edge reproducing section 5 can change image processing manners for portion on which a character edge flag is set depending on whether a halftone dot region flag is set on or not. More specifically, in case a halftone dot region flag is set on, smoothing is executed and in case not set on, edge enhancement is executed.

Figure 13:
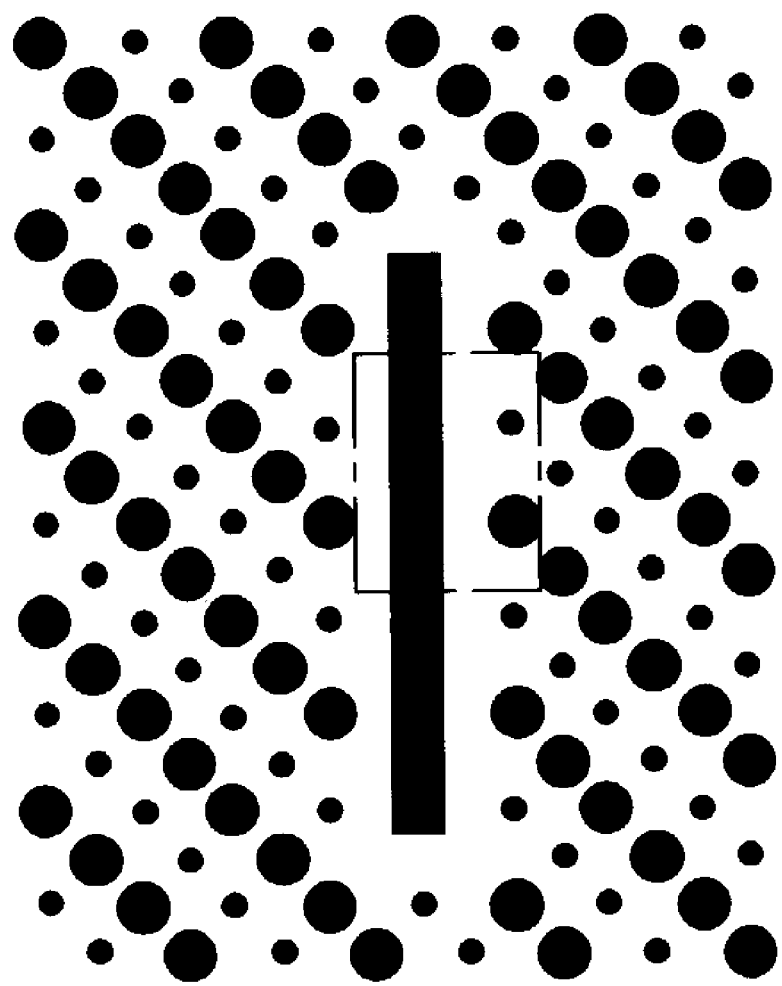
FIG. 13 is a magnified diagram showing an example of an inputted image dealt by an image forming apparatus directed to the embodiment.

Next, a practical example of image processing by an image forming apparatus directed to this embodiment will be described. FIG. 13 is a magnified diagram showing a part of an inputted image to be described as an example. This image is a combination of a black character and highlighted halftone dot background consisting of black isolated points. It should be noted that there are not arranged isolated points at quite close vicinity of the black character. It is FIG. 14 that shows a further magnified diagram of a portion enclosed with broken line in FIG. 13. The image of FIG. 14 includes a vertical line that is a portion of a character and two types of black isolated points that constitute halftone dots. The two types of the black isolated points are different in size. The upper one is one-dot size and the lower one is three-dot size.

Figure 14:
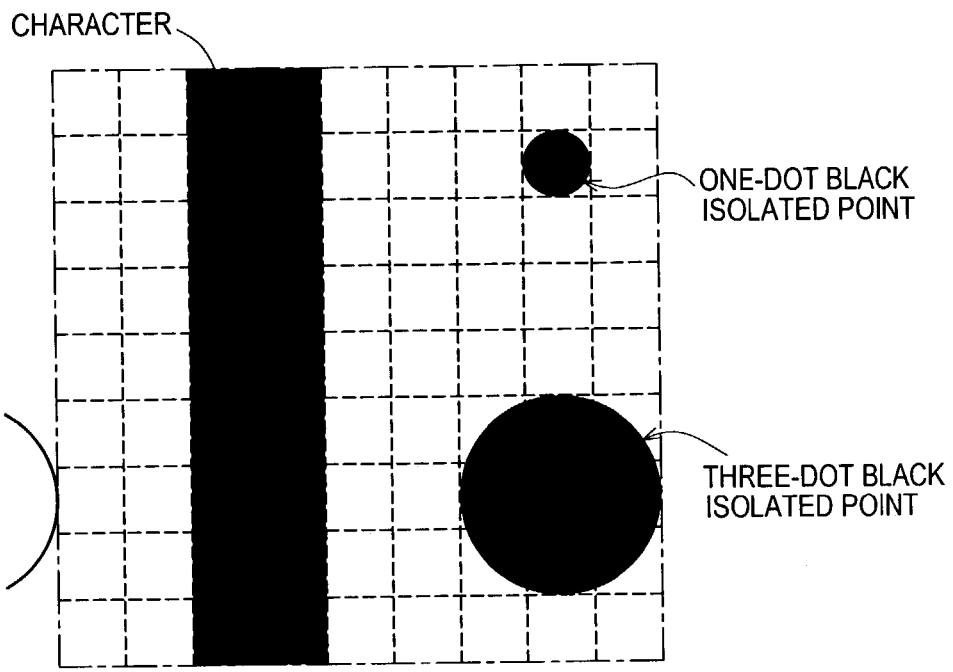
FIG. 14 is a partially-further-magnified diagram of FIG. 13.
Figure 15:
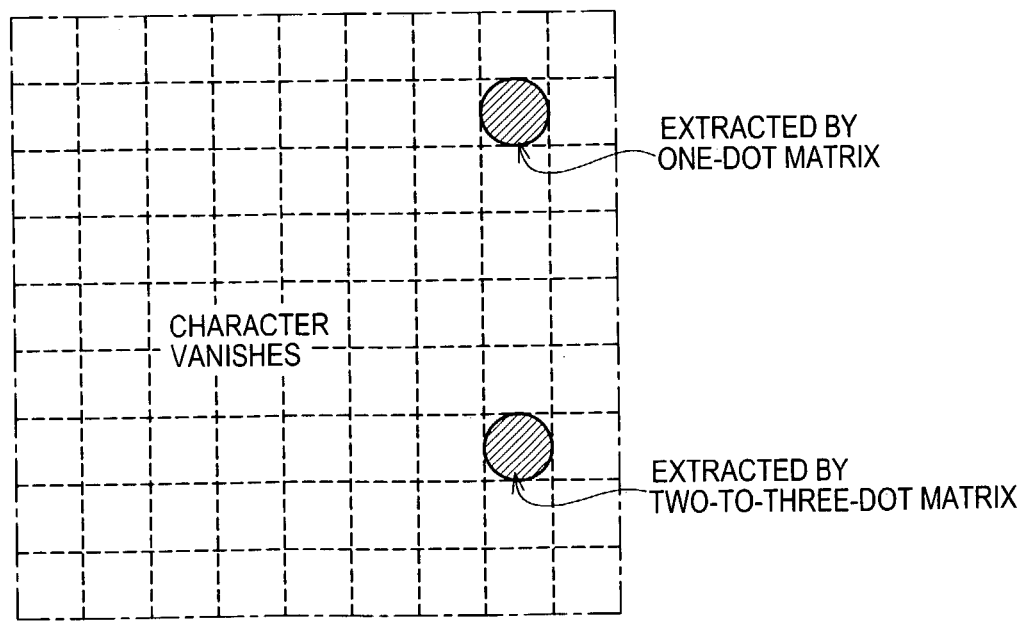
FIG. 15 is a diagram showing a result of isolated point discrimination with respect to the region indicated in FIG. 14.

In case the image data in FIG. 14 is processed with the isolated point discriminating section 41, the black isolated point discriminating section 411 works and a result as shown in FIG. 15 is obtained. As apparent from FIG. 15, the upper black isolated point in FIG. 14 is extracted by a one-dot matrix whereas the lower isolated point is extracted by a two-to-three-dot matrix. At this stage, even if it is a large-sized isolated point, only a pixel centered on the large-sized isolated point is extracted. Furthermore, the character portion at the left side in FIG. 14 is not extracted as an isolated point. This is because it does not satisfy extraction conditions of any-sized matrixes.

Figure 16:
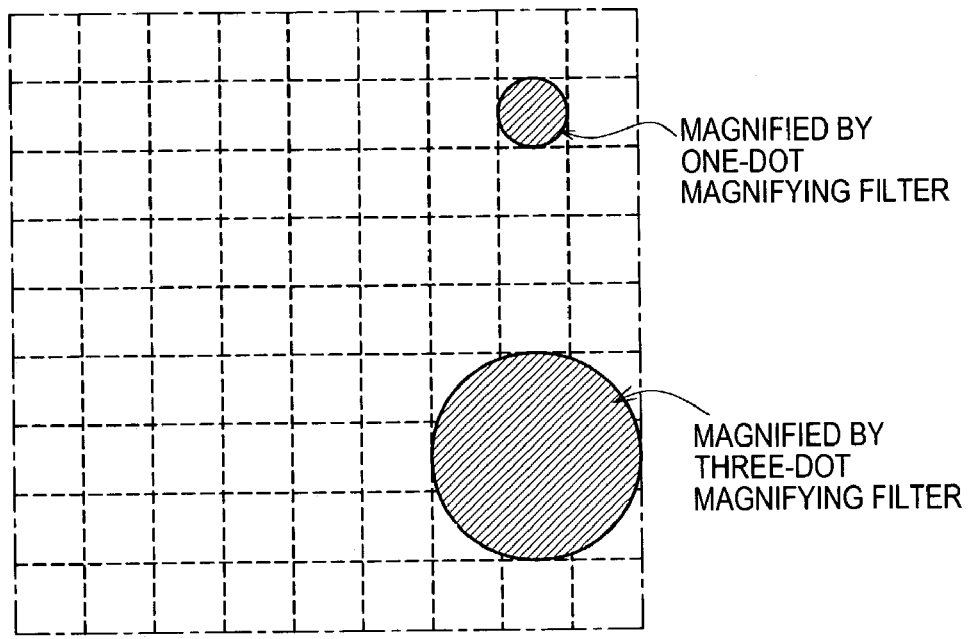
FIG. 16 is a diagram showing a result of isolated point magnification processing with respect to the region indicated in FIG. 15.

When processing at the isolated point magnifying section 43 is applied to this, a result shown in FIG. 16 is obtained by the magnification processing section 431. That is, the upper isolated point is processed by the one-dot magnifying filter and the lower one is processed by the two-to-three-dot magnifying filter. It depends on a size signal for the isolated point that which magnification filter is to be used for respective isolate points. In this case, since a count value of black isolated points is larger than that of white isolated points, an output from the comparator 432 is set off. As a result, an output from the OR circuit 433 is determined by an output from the magnification processing section 431. The result shown in FIG. 16 is thus obtained.

Figure 17:
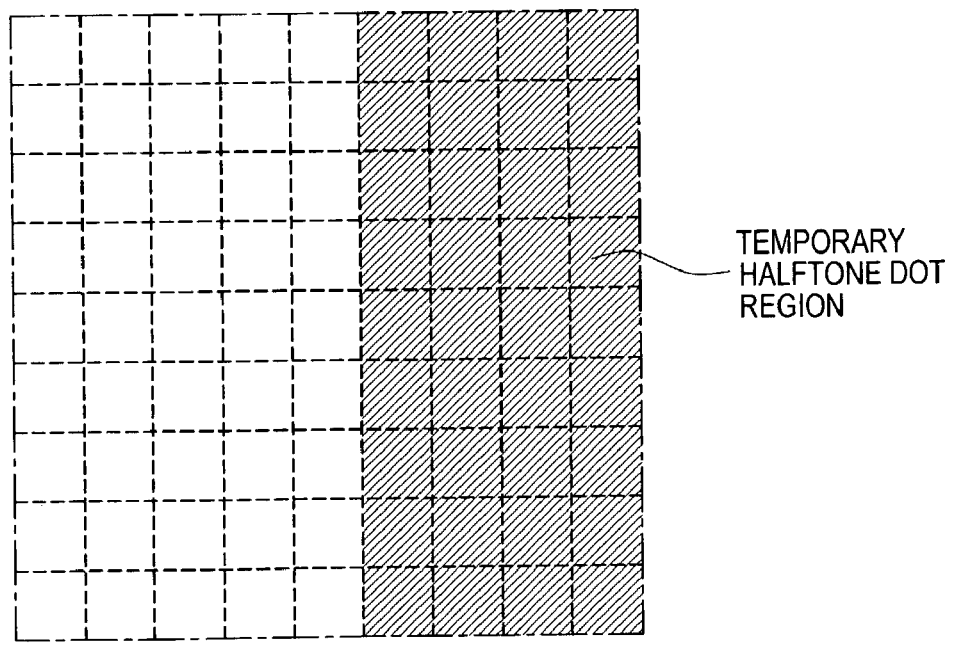
FIG. 17 is a diagram showing a result of processing by a temporary halftone dot region discriminating section with respect to the region indicated in FIG. 14.

On the other hand, FIG. 17 shows a resultant image of FIG. 14 processed by the temporary halftone dot region discriminating section 42. That is, a region where significant number of isolated points concentrate is discriminated as a temporary halftone dot region, which is because a count value of black isolated points exceeds a black isolated point threshold. On the other hand, because the character and the region at the vicinity of the character do not satisfy the conditions, they are not discriminated as temporary halftone dot region.

Figure 18:
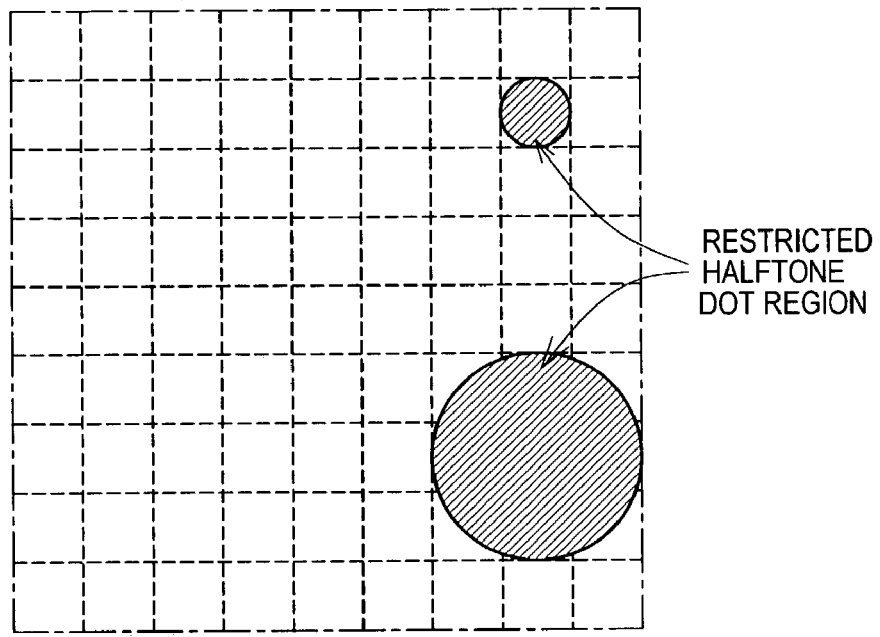
FIG. 18 is a diagram showing a restricted halftone dot region obtained by AND logical computation of FIG. 16 and FIG. 17.

Subsequently, the halftone dot region restricting section 44 obtains an AND logical computation result of the magnified isolated point region in FIG. 16 and the temporary halftone dot region in FIG. 17. That is, the temporary halftone dot region in FIG. 17 is restricted with the magnified isolated point region in FIG. 16. Thereby, there can be obtained a restricted halftone dot region as shown in FIG. 18.

Figure 19:
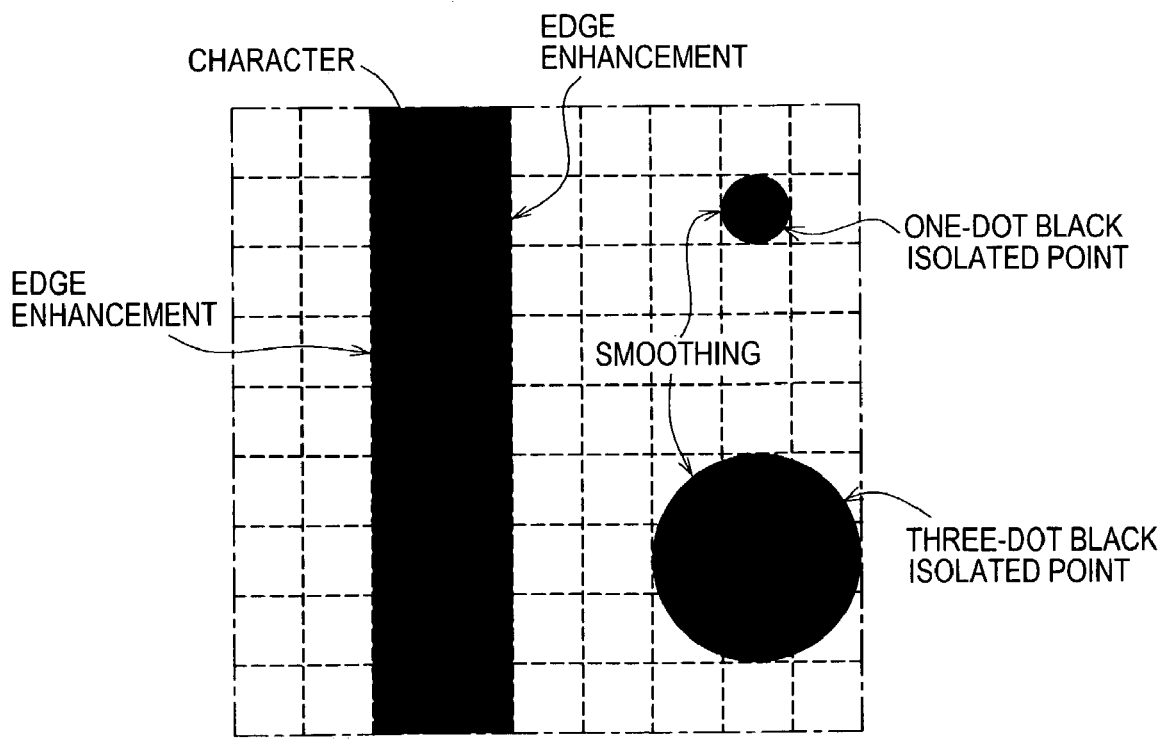
FIG. 19 is a diagram showing edge processing applied to a region indicated in FIG. 14 by an edge reproducing section.

Edge processing at the edge reproducing section 5 differs whether it is inside or outside of the restricted halftone dot region. As shown in FIG. 19, there is applied smoothing processing to an edge of the isolated point that constitutes a halftone dot region, because the edge is located in the restricted halftone dot region. On the other hand, there is applied edge enhancement processing to an edge of pixels that constitutes the character portion, because the edge is located outside of the restricted halftone dot region. Description so far is about processing for the image as shown in FIG. 13.

Figure 20:
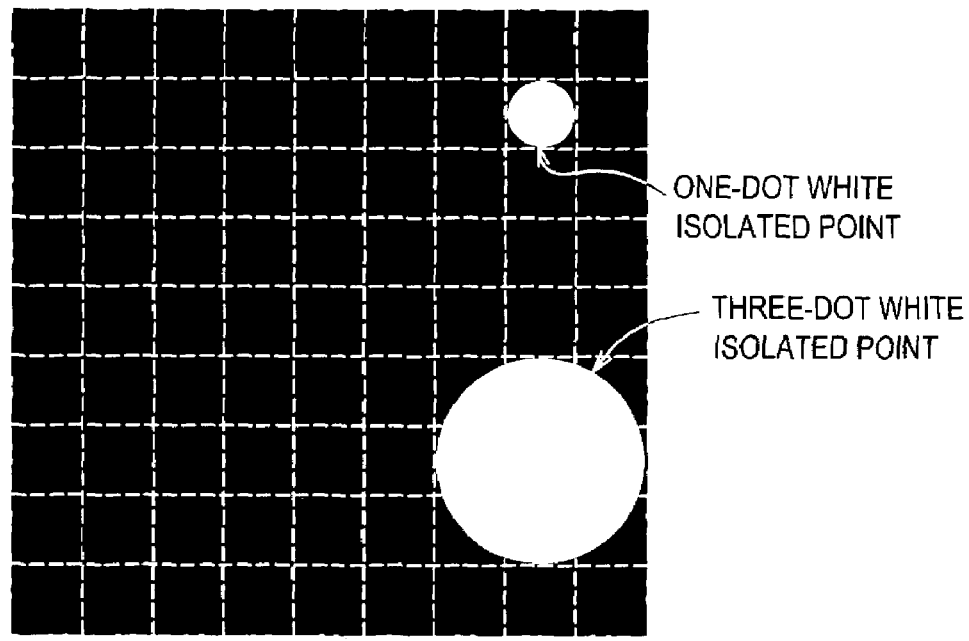
FIG. 20 is a magnified diagram showing an example of an inputted image dealt by an image forming apparatus directed to the embodiment.

Next, there will be described an example of image processing for a shadowy halftone dot region that is mainly composed of white isolated points. As an example of it, an image as shown in FIG. 20 will be used. The image of FIG. 20 is same scale as that of FIG. 14 and shows two white isolated points against black background. However, it should be noted that the place where a part of a character is arranged in FIG. 14 is not equivalently provided on the corresponding portion of the image in FIG. 20 but it is just black background. This is because a character is generally arranged against highlighted halftone dotted background in case the character is arranged within a halftone dot region.

Figure 21:
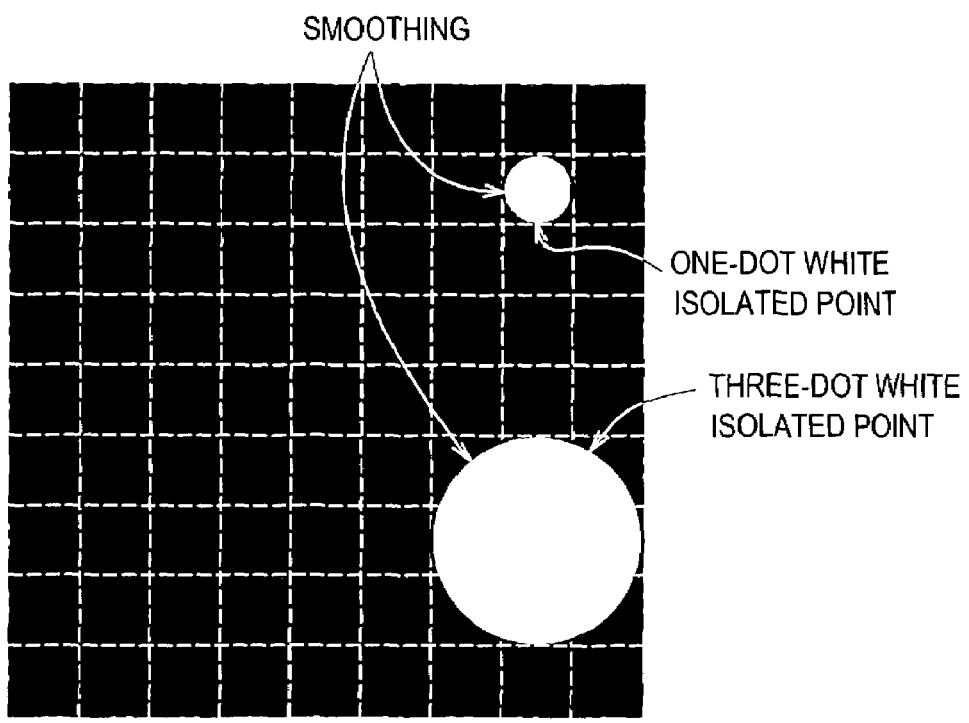
FIG. 21 is a diagram showing edge processing applied to a region indicated in FIG. 20 by an edge reproducing section.

The image data shown in FIG. 20 is processed by the white isolated point discriminating section 412 in the isolated point discriminating section 41. A processed result of it is almost same as what is shown in FIG. 15. However, the extracted isolated point is a white isolated point. Accordingly, the count value of white isolated points at the white isolated point counter 422 in the temporary halftone dot discriminating region 42 exceeds a white isolated point threshold. Thereby, a temporary halftone dot region is determined. A resultant image of it is same as what is shown in FIG. 17. Subsequently, an output from the comparator 432 is set ON at the isolated point magnifying section 43, because the count value of white isolated points exceeds that of black isolated points. Accordingly, an output from the OR circuit 433, i.e., a magnified isolated point signal, is set ON regardless of an on/off output from the magnification processing section 431. Therefore, the temporary halftone dot region of FIG. 17 is simply regarded as a halftone dot region by the halftone dot region restricting section 44. Thereby, as shown in FIG. 21, smoothing processing is applied to edges of respective white isolated points. Description in the above is about processing for the image shown in FIG. 20.

described, in the image forming apparatus of the present embodiment, a black isolated point extracted as a single pixel by the black isolated point discriminating section 411 is magnified to its original size at the magnification processing section 431. Then, out of the magnified isolated point region, a temporary halftone dot region determined by the temporary halftone dot region discriminating section 42 is restricted. Based on the restricted halftone dot region, type of image processing to edge portions in image data is selectively applied. Accordingly, in case a character or the like is arranged against a highlighted halftone dot region, there are exhibited the following effects. That is, smoothing processing is applied to an edge of an isolated point that constitutes halftone dots and at the same time, edge enhancement processing is applied to an edge of a portion that constitutes a character or the like. There can be executed appropriate image processing depending on regional characteristics of an image.

The image forming apparatus of this embodiment has a plurality of extraction matrixes different in size in the black isolated point discriminating section 411. Thereby, a pixel at the center of a black isolated point is discriminated and size of the isolated point is detected. Furthermore, the magnification processing section 431 has magnifying filters for respective sized extraction matrixes. Thereby, various sized black isolated points can be magnified to their respective original sizes without counting an identical dot more than once. Furthermore, the image forming apparatus of the present embodiment handles a black isolated point and a white isolated point in different manners. Therefore, both a highlighted halftone dot region and a shadowy halftone dot region can be appropriately processed, respectively.

Second Embodiment

Figure 22:
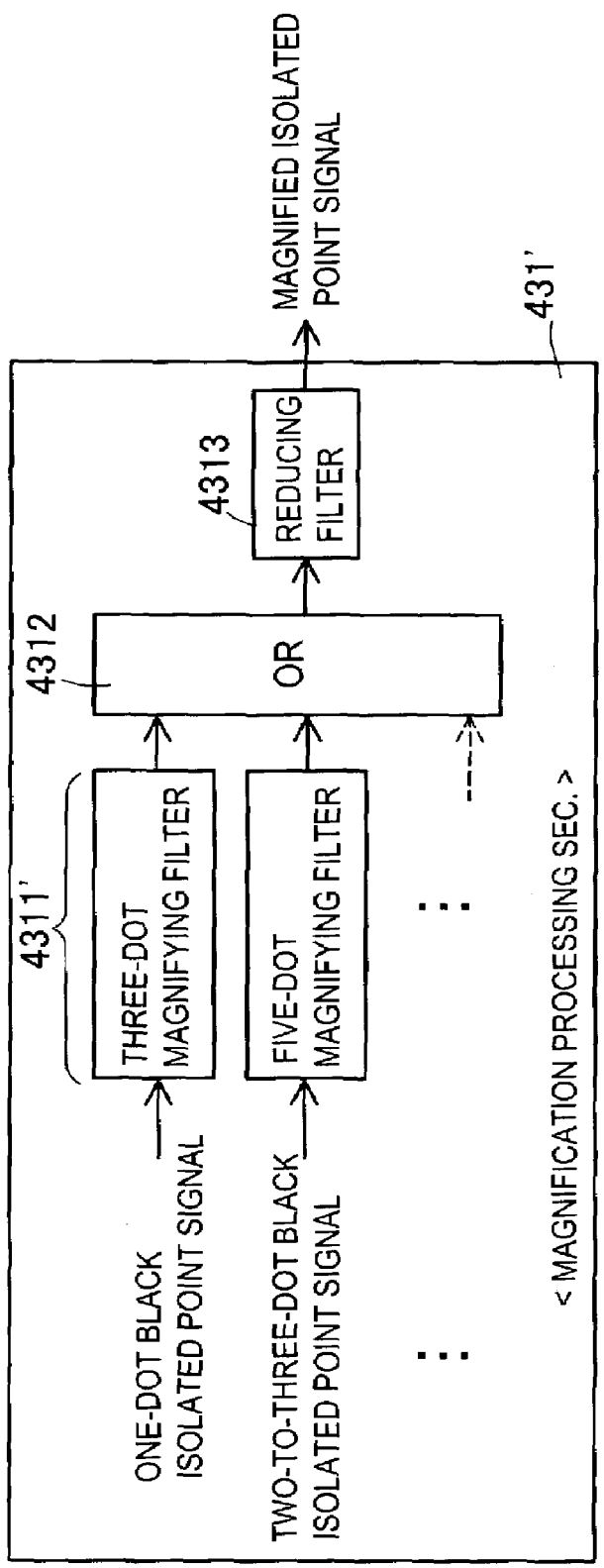
FIG. 22 is a block diagram showing structure of magnification processing section directed to a second embodiment.

An image forming apparatus directed to a second embodiment is structured almost same as the first embodiment other than a point that the magnification processing section 431 (see FIG. 11) in the isolated point magnifying section 43 is replaced with a magnification processing section 431' shown in FIG. 22. Therefore, only the magnification processing section 431' will be described and other component elements of the second embodiment will be referred to descriptions of the first embodiment.

The magnification processing section 431' of this embodiment includes a magnifying filter group 4311' instead of the magnifying filter group 4311. Similar to the first embodiment, the magnifying filter group 4311' includes magnifying filters as many as the number of matrixes for extracting black isolated points at the black isolated point discriminating section 411. However, in the magnifying filter group 4311', a one-dot black isolated point signal is inputted to a three-dot magnifying filter and a two-to-three-dot black isolated point signal is inputted to a five-dot magnifying filter. Furthermore, there is provided a reducing filter 4313 behind an OR circuit 4312. That is, respective sized isolate point signals are magnified to one-dot larger size at magnification processing stage and after OR logical computation, the size is reduced down by one-dot size.

Figure 23:
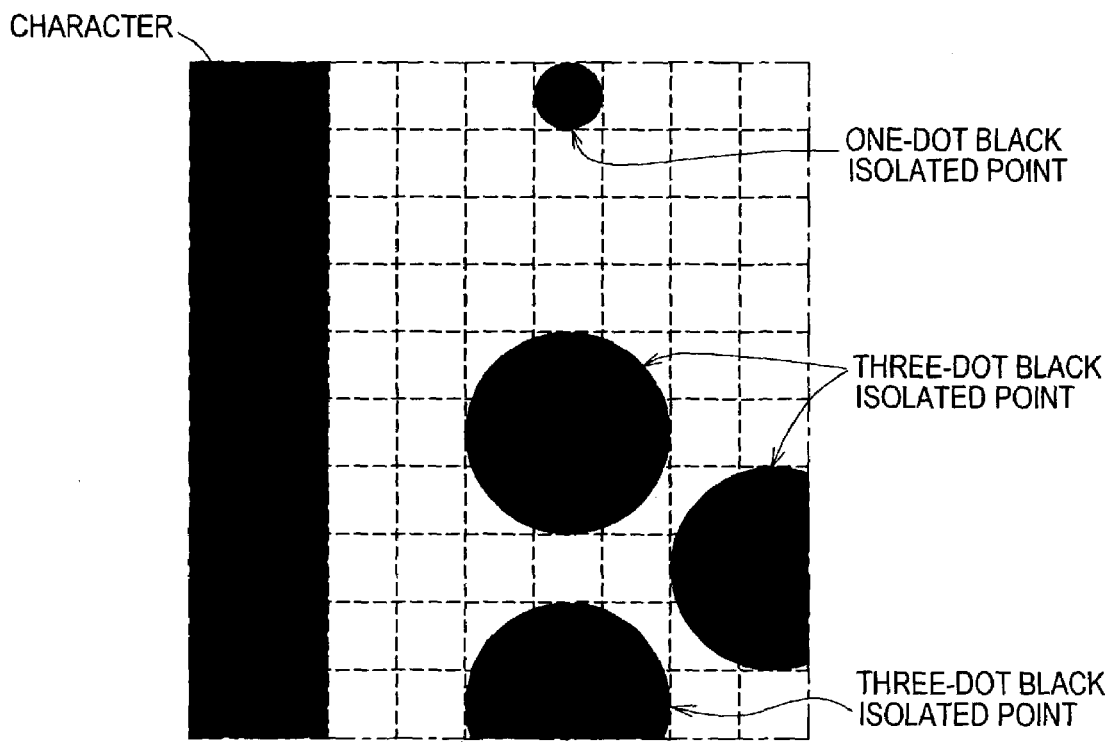
FIG. 23 is a magnified diagram showing an example of an inputted image dealt by an image forming apparatus directed to the second embodiment.
Figure 24:
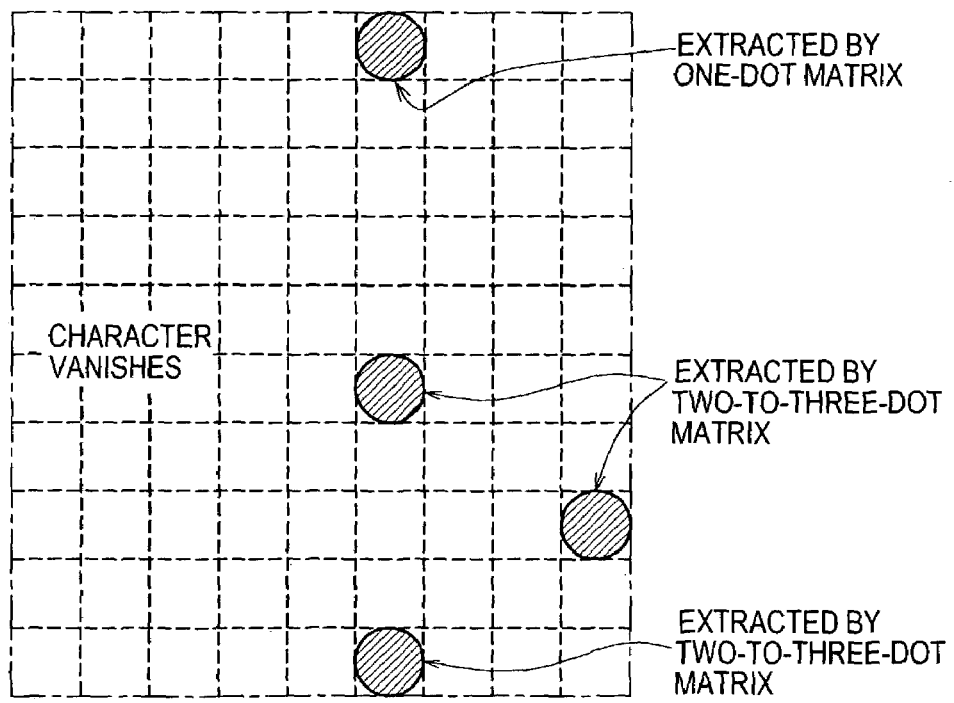
FIG. 24 is a diagram showing a result of isolated point discrimination with respect to the region indicated in FIG. 23.
Figure 25:
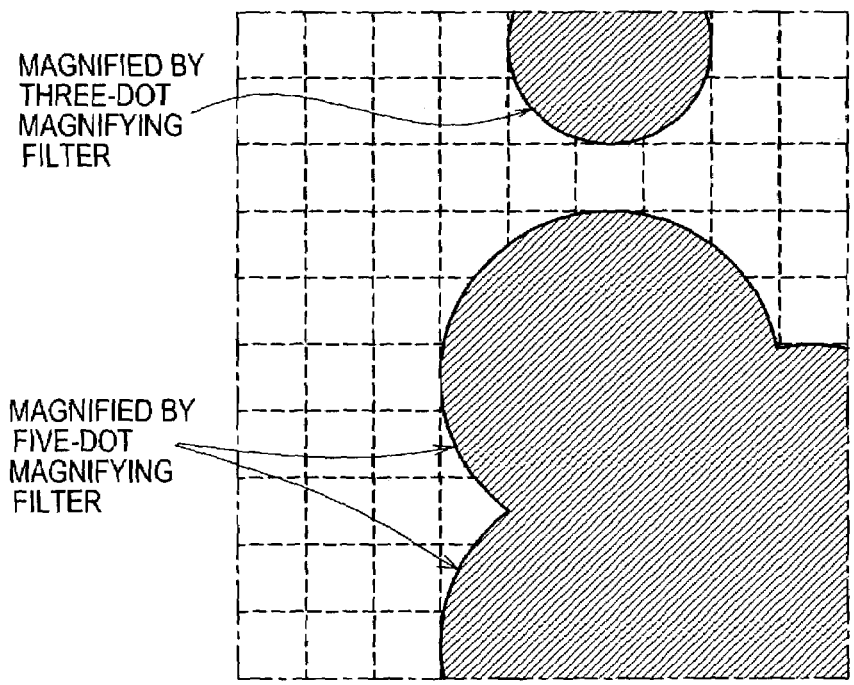
FIG. 25 is a diagram showing a result of magnification with a magnifying filter group with respect to the region indicated in FIG. 24.
Figure 26:
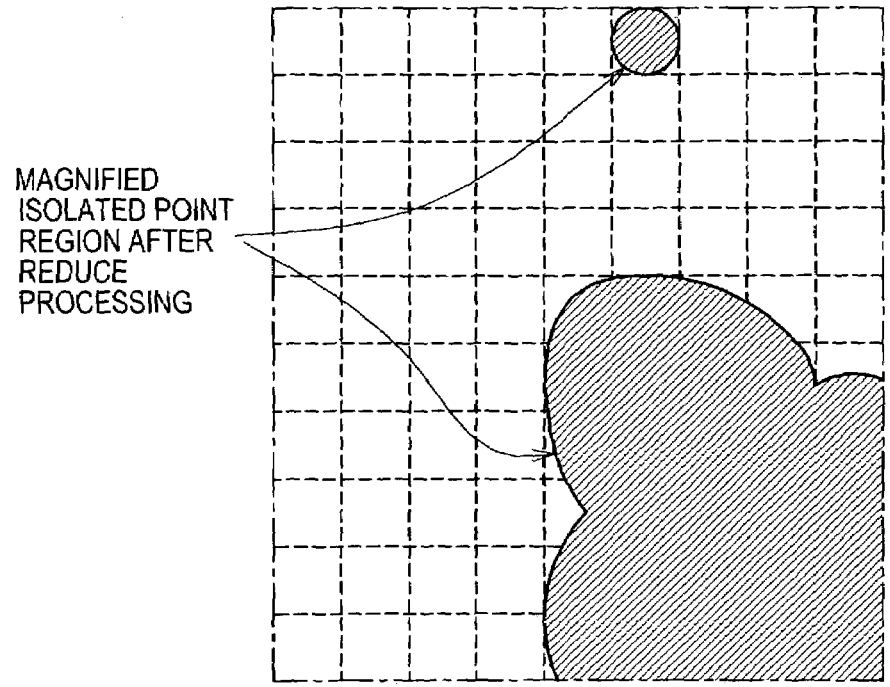
FIG. 26 is a diagram showing a result of reduce processing by a reducing filter with respect to the region indicated in FIG. 25.

Thereby, the entirety of a region where isolated points concentrate can be defined as a magnified isolated point region. As an example of it, an image shown in FIG. 23 will be described. FIG. 23 is same scale as FIG. 14 and at the lower right portion of FIG. 23, there exist a plurality of three-dot-sized black isolated points adjoining to one another. Other than the three-dot-sized black isolated points, FIG. 23 includes a vertical line, i.e., a part of a character and a single one-dot black isolated point. Though it is outside of the region of FIG. 23, there are repeatedly arranged even more three-dot-sized black isolated points rightward and downward of the adjoining three-dot sized black isolated points. In case image data of FIG. 23 is processed by the isolated point discriminating section 41, the black isolated point discriminating section 411 works and a resultant image as shown in FIG. 24 can be obtained. This image corresponds to FIG. 15 directed to the first embodiment. In case the resultant image is further processed by the isolated point magnifying section 43, the magnifying filter group 4311' and the OR circuit 4312 in the magnification processing section 431' work and a temporary image as shown in FIG. 25 is obtained. Furthermore, the temporary image is processed by the reducing filter 4313 and changes into an image shown in FIG. 26. The image of FIG. 26 corresponds to FIG. 16 directed to the first embodiment. Respective black isolated points in FIG. 25 are magnified to one-size larger in both horizontal and vertical directions. Therefore, magnified isolated point regions overlap one another and form a united large portion at some parts. Therefore, the reducing filter 4313 cuts out a surrounding of the magnified region by one dot. The united large portion due to magnification processing remains as a united portion even after reduce processing. Accordingly, even after reducing processing, i.e., in FIG. 26, the entirety of a region where three-dot-sized black isolated points are repeatedly arranged forms a magnified isolated point region.

Figure 27:
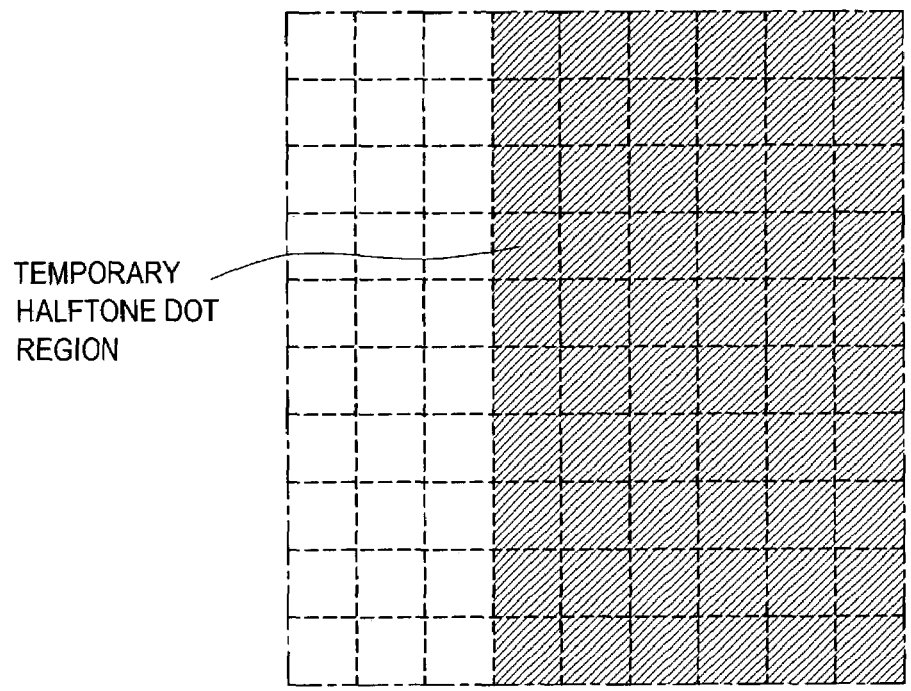
FIG. 27 is a diagram showing a result of processing by the temporary halftone dot region discriminating section with respect to the region indicated in FIG. 23.
Figure 28:
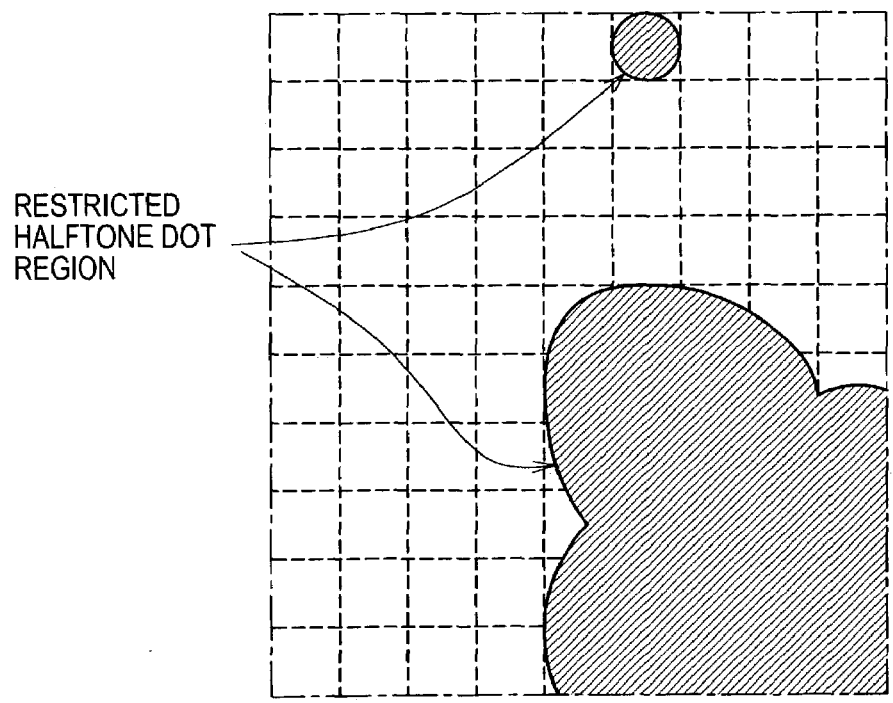
FIG. 28 is a diagram showing a restricted halftone dot region obtained by AND logical computation of FIG. 26 and FIG. 27.

On the other hand, FIG. 27 shows a resultant image of FIG. 23 processed by the temporary halftone dot region discriminating section 42. This is almost same as FIG. 17 directed to the first embodiment. Next, at the halftone dot region restricting section 44, a temporary halftone dot region of FIG. 27 is restricted based on the magnified isolated point region of FIG. 26. Thereby, there can be obtained a restricted halftone dot region as shown in FIG. 28.

Figure 29:
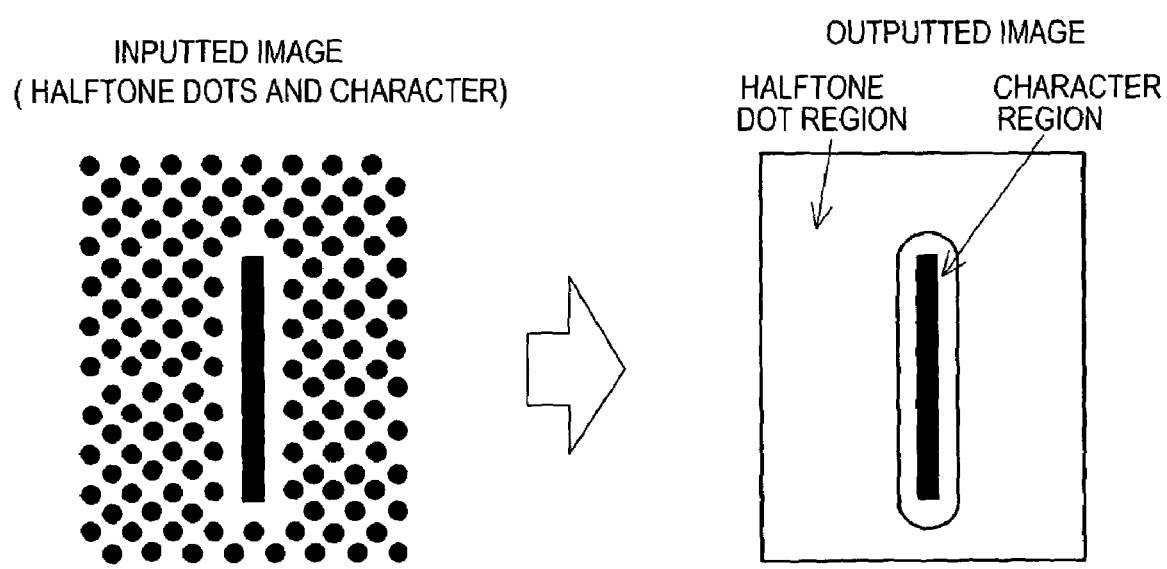
FIG. 29 is a diagram showing an example of image processing by the image forming apparatus directed to the embodiment.

As described, in the second embodiment, a pixel extracted as a black isolated point is magnified to a size larger than its original size at the step of magnification. After magnification processing, reduction processing for reducing excessive extent of magnification is executed to obtain a magnified isolated point region. Thereby, the entirety of a region where significant number of isolated points concentrate is discriminated as a magnified isolated point region. Accordingly, as shown in FIG. 29, the entirety of region where isolated points are arranged close to one another can be discriminated as a restricted halftone dot region. It should be noted that a character or the like is never included in a halftone dot region under this condition. Therefore, smoothing processing can surely be applied to the entirety of halftone dot region. On the other hand, even if magnification processing is applied to a single isolated point, the magnified single isolated point never overlaps with a magnified isolated point region on the basis of other isolated points. Accordingly, a single isolated point on the basis of a noise or the like and around the entirety of the point is never discriminated as a halftone dot region. Furthermore, it is similar to the case of a single isolated point that is part of a character or the like.

The above described embodiments are provided for mere illustrative purpose, and the present invention is not limited thereto. Of course, various modifications or variations can occur without departing the spirit of the invention. For example, in the first embodiment, each isolated point may be magnified to a size larger than its original size through the magnifying filter group 4311 in the magnification processing section 431. Thereby, an outer edge of a black isolated point that constitutes a halftone dot region is included in a restricted halftone dot region. Similarly, in the second embodiment, reducing degree by the reducing filter 4313 may be smaller than excessiveness of magnification degree by the magnifying filter group 4311'. However, in both cases, excessiveness of magnification degree should be restricted to a degree that figure such as character or the like is not included in a halftone dot region.

While white letters on shadowy halftone dot background are not considered in the embodiments, they can be considered. For that purpose, white isolated points should be handled in the same manners for handling black isolated points. That is, the isolated point magnifying section 43 should be provided with a white isolated point magnification processing section. Not to mention, magnification processing is conducted by magnifying a white isolated point signal based on a white isolated point size signal. In such a case, a comparator 432 should not be provided. That is, the OR circuit 433 takes an OR logical computation result of magnified isolated point signals of both colors (black and white) from the magnifying processing section. Thereby, edge enhancement processing can be applied to both a black character on highlighted halftone dot region and a white character on shadowy halftone dots and at the same time, smoothing processing can surely be applied to halftone dot region regardless of its lightness, otherwise, it is also possible that only white characters on a shadowy halftone dot region are considered and but not black characters on highlighted halftone dot region.

Furthermore, in both the first and second embodiments, the temporary halftone dot region discriminating section 42 may be provided with a third counter that counts the number of both black isolated point signals and white isolated point signals. In that case, a third comparator for comparing the count value with its threshold should be provided and the OR circuit 423 should conduct OR logical computation among outputs from the three comparators.

As apparent from the descriptions, the present invention provides an image processing apparatus capable of precisely discriminating a halftone dot region and solid-lined figure such as a character on the halftone dot region and applying appropriate image processing to the halftone dot region and a character separately.

What is claimed is:

1. An image processing apparatus for extracting a halftone dot region in inputted image data, the image processing apparatus comprising:
   an isolated point detecting section for detecting an isolated point in inputted image data and a size of the isolated point;
   a temporary halftone dot region determining section for determining a temporary halftone dot region based on presence of isolated points detected by the isolated point detecting section;
   an isolated point magnifying section for determining a magnified isolated point region that is equivalent to magnification of an isolated point detected by the isolated point detecting section up to at least a size of the isolated point detected by the isolated point detecting section; and
   a halftone dot region restricting section for determining a halftone dot processing region that is equivalent to restriction of a temporary halftone dot region with reference to a magnified isolated point region based on a temporary halftone dot region determined by the temporary halftone dot region determining section and a magnified isolated point region determined by the isolated point magnifying section.

2. An image processing apparatus according to claim 1, wherein the isolated point detecting section extracts an isolated point in inputted image data using a plurality of isolated point extracting matrixes different in size, and in case an isolated point is extracted, a size of the isolated point is determined equivalent to a size of an isolated point extracting matrix that has extracted the isolated point.

3. An image processing apparatus according to claim 2, wherein, in case a pixel is extracted as an isolated point by two or more of the isolated point extracting matrixes, the isolated point detecting section determines a size of the isolated point equivalent to a largest size of the isolated point extracting matrixes that extracted the pixel.

4. An image processing apparatus according to claim 1, wherein the isolated point detecting section detects a light isolated point and a dark isolated point separately.

5. An image processing apparatus according to claim 4, wherein the temporary halftone dot region determining section separately counts up light isolated points and dark isolated points detected by the isolated point detecting section and determines a temporary halftone dot region based on a count value of light isolated points and that of dark isolated points.

6. An image processing apparatus according to claim 4, wherein
   the halftone dot region restricting section does not restrict a temporary halftone dot region based on a magnified isolated point region in case one type of light isolated points and dark isolated points exceeds other type in number within the temporary halftone dot region, and
   the halftone dot region restricting section regards a logical product of a temporary halftone dot region and a magnified isolated point region as a halftone dot processing region in case the other type of light isolated points and dark isolated points exceeds the one type in number within the temporary halftone dot region.

7. An image processing apparatus according to claim 6, wherein the isolated point magnifying section magnifies either light isolated points or dark isolated points that exceed in number within a temporary halftone dot region which is subject to restriction with a magnified isolated point region to their respective sizes detected by the isolated point detecting section and regards as a magnified isolated point region.

8. An image processing apparatus according to claim 1, wherein the isolated point magnifying section magnifies target isolated points to sizes larger than respective sizes detected by the isolated point detecting section and after that, reduces respective sizes to regard each isolated point as a magnified isolated point region.

9. An image forming apparatus for extracting a halftone dot region in inputted image data and executing image formation based on inputted image data by making using of an extraction result, the image forming apparatus comprising:
- an isolated point detecting section for detecting an isolated point in inputted image data and a size of the isolated point;
- a temporary halftone dot region determining section for determining a temporary halftone dot region based on presence of isolated points detected by the isolated point detecting section;
- an isolated point magnifying section for determining a magnified isolated point region that is equivalent to magnification of an isolated point detected by the isolated point detecting section up to at least a size of the isolated point detected by the isolated point detecting section;
- a halftone dot region restricting section for determining a halftone dot processing region that is equivalent to restriction of a temporary halftone dot region with reference to a magnified isolated point region based on a temporary halftone dot region determined by the temporary halftone dot region determining section and a magnified isolated point region determined by the isolated point determining section; and
- an image forming engine for forming an image based on the image data the halftone dot region of which has been processed with predetermined image processing.

10. Image processing method for extracting a halftone dot region in inputted image data, the image processing method comprising:
- a first step of detecting an isolated point in inputted image data and a size of the isolated point;
- a second step of determining a temporary halftone dot region based on presence of isolated points detected at the first step;
- a third step of determining a magnified isolated point region that is equivalent to magnification of an isolated point detected at the first step up to at least a size of the isolated point detected at the first step; and
- a fourth step of determining a halftone dot processing region that is equivalent to restriction of a temporary halftone dot region with reference to a magnified isolated point region based on a temporary halftone dot region and a magnified isolated point region determined at the second and third steps.

11. Image processing method according to claim 10, wherein, at the first step,
- an isolated point in inputted image data is extracted using a plurality of isolated point extracting matrixes different in size; and
- a size of the isolated point is determined equivalent to a size of an isolated point extracting matrix that has extracted the isolated point in case an isolated point is extracted.

12. Image processing method according to claim 11, wherein, at the first step, in case a pixel is extracted as an isolated point by two or more of the isolated point extracting matrixes, a size of the isolated point is determined equivalent to a largest size of the isolated point extracting matrixes that extracted the pixel.

13. Image processing method according to claim 10, wherein, at the first step, a light isolated point and a dark isolated point are detected separately.

14. Image processing method according to claim 13, wherein, at the second step, light isolated points and dark isolated points detected at the first step are separately counted up and a temporary halftone dot region is determined based on a count value of light isolated points and that of dark isolated points.

15. Image processing apparatus according to claim 13, wherein, at the fourth step,
- a temporary halftone dot region is not restricted based on a magnified isolated point region in case one type of light isolated points and dark isolated points exceeds other type in number within the temporary halftone dot region, and
- a logical product of a temporary halftone dot region and a magnified isolated point region is regarded as a halftone dot processing region in case the other type of light isolated points and dark isolated points exceeds the one type in number within the temporary halftone dot region.

16. Image processing method according to claim 15, wherein, at the third step, either light isolated points or dark isolated points that exceed in number within a temporary halftone dot region which is subject to restriction with a magnified isolated point region is magnified to their respective detected sizes and is regarded as a magnified isolated point region.

17. Image processing method according to claim 10, wherein, at the third step, target isolated points are magnified to sizes larger than respective sizes detected at the first step and after that, the respective sizes are reduced to regard each isolated point as a magnified isolated point region.

* * * * *